No. 655,660. Patented Aug. 7, 1900.
G. L. REENSTIERNA.
STEERING MECHANISM FOR VEHICLES.
(Application filed Oct. 9, 1899.)
(No Model.)
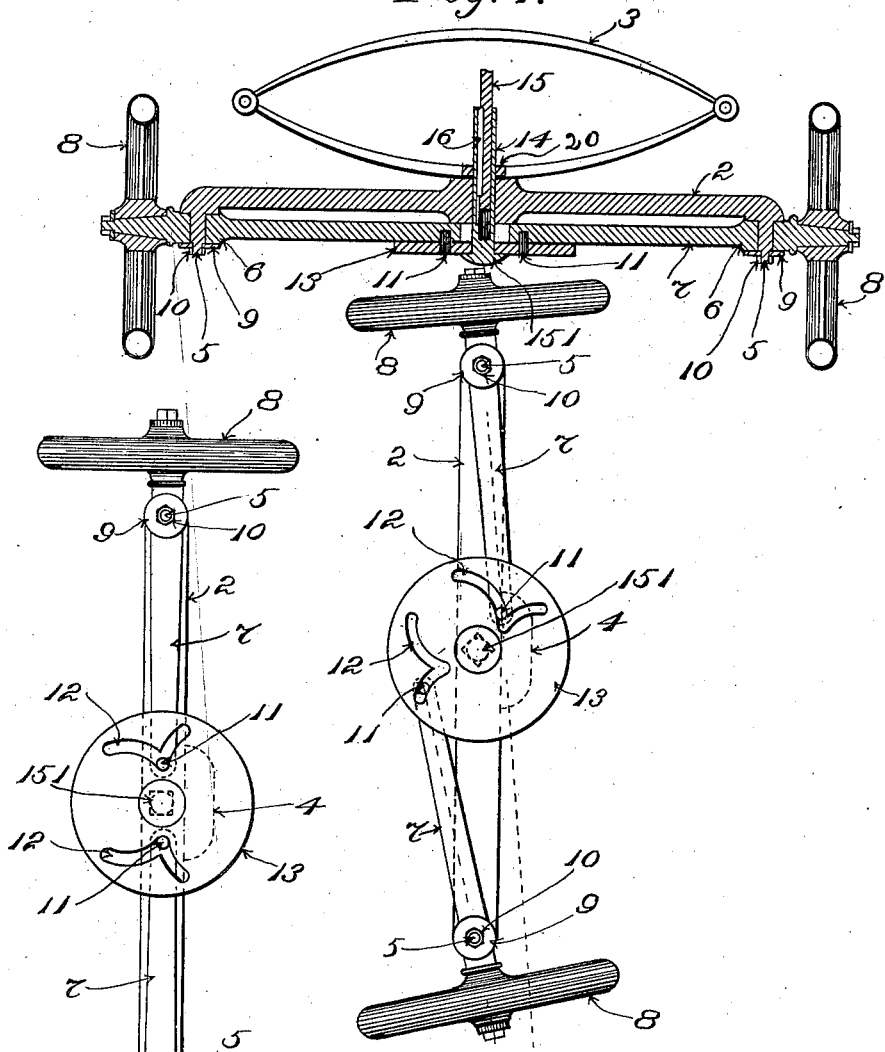
Witnesses:
Oscar F. Hill
Edith J. Anderson
Inventor:
Gustaf L. Reenstierna
by MacLeod Calver & Randall
his Attorneys.

UNITED STATES PATENT OFFICE.

GUSTAF L. REENSTIERNA, OF WINCHESTER, MASSACHUSETTS.

STEERING MECHANISM FOR VEHICLES.

SPECIFICATION forming part of Letters Patent No. 655,660, dated August 7, 1900.

Application filed October 9, 1899. Serial No. 733,029. (No model.)

*To all whom it may concern:*

Be it known that I, GUSTAF L. REENSTIERNA, a citizen of the United States, residing at Winchester, in the county of Middlesex, State of Massachusetts, have invented a certain new and useful Improvement in Steering Mechanisms for Vehicles, of which the following is a specification, reference being had therein to the accompanying drawings.

Four-wheeled vehicles, such as are intended for road use and especially such as are propelled by motors located within the vehicle itself, are commonly provided with steering mechanism by means of which the front wheels of the vehicle may be swung to change its direction. As ordinarily constructed, this steering mechanism operates to swing both the forward wheels in the same direction and to the same extent, so that they continue to revolve in planes parallel with each other. As is well known, this causes one of the wheels to grind or slide, which is injurious to the tire, especially if the tire be of the pneumatic type commonly employed. Such mechanism is further objectionable in that on rough ground the forward wheels have a tendency to swing, thus causing a change in the direction of movement of the vehicle and requiring the person in charge to constantly hold the steering-lever firmly, and subjecting the hand and arm of the person steering the vehicle to a trembling or vibratory movement which is undesirable.

My invention has for its object to provide a steering mechanism for such vehicles which shall be free from the objections above noted. My improvement is fully set forth in the following description and accompanying drawings, and the novel features thereof are pointed out and clearly defined in the claim at the close of this specification.

Having reference to the drawings, Figure 1 is a vertical section lengthwise of the axles, showing the forward wheels of a vehicle with my improvement applied thereto. Fig. 2 is a plan view of said wheels from the under side thereof with the spring on which the body of the vehicle rests omitted. Fig. 3 is a similar view showing the wheels in a position which they will occupy when the direction of movement of the vehicle is being changed.

At 2 is shown a cross-bar upon which the forward spring 3 of the vehicle is directly supported. A rearward projection 4 from the bar 2 (shown in dotted lines in Fig. 3) is provided upon which the spring 3 is secured. At each end of the bar 2 there is a downwardly-projecting bolt 5, which may be either formed integral with the bar 2, as shown, Fig. 1, or may be suitably secured thereto in any well-known manner. The bolts 5 pass through holes or bearings formed to receive them in the bosses 6, formed on the axle-bars 7. The wheels 8 are mounted upon the axle-bars 7 outside the bolts 5 in any well-known manner, the precise method of mounting the wheel on its axle not being material to my present invention.

On the lower ends of the bolts 5 below the axle-bar 7 I provide a washer 9 and nut 10 or other equivalent device for preventing the bolt 5 from being withdrawn from the hole or bearing in the axle-bar. Each of the wheels 8 is mounted on an independent axle-bar, and the said bars project inwardly toward the middle of the cross-bar 2, as shown, and are provided at their inner ends with pins 11, which project downwardly into slots 12, formed in a disk or plate 13. The disk 13 is located directly underneath the inner ends of the axle-bars 7 (see Fig. 1) and is held securely in this position by means of a hollow rod or sleeve 14, which is squared at the lower end and passes through a square hole in the center of the disk 13. Said disk is provided with a head 151, which holds the disk on the rod, all as shown, Fig. 1. The hollow rod or sleeve 14 passes upwardly through a hole or bearing formed, preferably, in a boss or thickened portion of the cross-bar 2. The disk 13 is, as above described, secured to the sleeve 14, so that as the sleeve is rotated the disk 13 will be rotated, and the sleeve is further secured in its bearing in the boss or thickened portion of the cross-bar 2 by a screw-nut 20, screwed onto the sleeve, as shown, and bearing against the upper surface of the said boss, thus permitting the sleeve to be rotated, while at the same time it is prevented from moving vertically. A rod 15 is placed within the sleeve 14 and is secured thereto by means of a spline 16, so that while the rod 15 is free to move vertically relatively to the sleeve 14 it cannot rotate independently thereof. To the rod 15 is secured a lever or other suitable device (not shown) by means of which the said rod 15, sleeve 14, and disk 13 may be rotated or partially rotated. By securing the rod 15 and sleeve 14 by means of a spline, which permits the vertical movement of the rod 15 relatively to the sleeve 14, the upper end of the rod 15 and the steering-lever secured thereto may be maintained at the same height relatively to the vehicle-body whether the springs of the vehicle be compressed or not. By this arrangement the rod 15 may be secured to the body of the vehicle, so as to move vertically therewith when the springs of the vehicle are compressed or extended. By rotating or partially rotating the disk 13 the position of the pins 11 in the cam-slots 12 is changed, and the cam-slots are of such a shape and are so located relatively to each other and to the disk 13 that the axle-bars 7 may be swung on the bolts 5 unequally, and so that each wheel will be swung into the position which it should occupy when the forward wheels are passing around a curve to prevent the drag or slide of either wheel. This will be clear from the diagrammatic lines 17 and 18, Fig. 3. In said Fig. 3 the disk 13, axle-bars 7, and wheels 8 are shown in the position which they should occupy when the said wheels are turning around a center represented as where the lines 17 and 18 meet. The wheel farthest from the said center is describing a curve whose radius is indicated by the line 17, and, as will be seen, its axle-bar is in line with the said radius 17 and the wheel is tangential to and can freely move in a circle of which the line 17 is the radius. The wheel nearest the center is describing a circle of which the line 18 is the radius, and, as will be seen, said wheel and its axle-bar are in proper relation to said radius, so that the wheel may move in a circle of that radius freely. The bolts 5, on which the axle-bars 7 are pivoted, are located near the wheels, while the inwardly-extending portion of the axle-bar is relatively long, allowing a long leverage, and thereby rendering it possible to swing the wheels easily and by the application of only a slight amount of power to the steering-handle or other part by means of which the disk 13 is moved, while at the same time a considerable degree of force is required to move the axle-bar 7 on its pivot 5 when the force is applied at the wheel, and thus the tendency of the wheels to swing and change the direction of the vehicle in passing over rough ground is reduced to a minimum and the unpleasant tremor or jar noticeable in the steering-handle of the steering mechanism now in common use is eliminated. The steadiness of the wheels and their tendency to resist any swing or movement caused by rough ground or the like is greatest when the vehicle is moving straight forward. At this time the pins 11 are in the position in the cam-slots 12, (shown in Fig. 2,) each pin being located at the point where the two wings or parts of the cam-slots unite. The position of the pins is therefore such as to steady the axle-bars 7 and hold the wheels against any tendency to swing due to the roughness of the road or the like. The apex or point where the two points of the cam-slot unite forms, in other words, a kind of lock sufficient to steady the axle-bars and prevent the wheels from being accidentally swung to change the direction of the vehicle, thus relieving the operator from the strain of holding the vehicle to its course.

What I claim is—

The steering-gear comprising a pair of wheels, the independent pivoted axle-bars having the said wheels mounted on the short arms thereof, and their long inner arms extending into proximity to each other at their inner ends, and the actuating-disk, the said disk and long arms having the coacting cam slots and pins, whereby movement of said disk operates to swing the axle-bars respectively into line with radii of the respective curves which the said wheels should describe in changing the direction of movement of the vehicle.

In testimony whereof I affix my signature in presence of two witnesses.

GUSTAF L. REENSTIERNA.

Witnesses:
WM. A. MACLEOD,
CHAS. F. RANDALL.